United States Patent [19]

Glaser et al.

[11] Patent Number: 4,725,206
[45] Date of Patent: Feb. 16, 1988

[54] THERMAL ISOLATION SYSTEM FOR TURBOCHARGERS AND LIKE MACHINES

[75] Inventors: Jerry Glaser, Playa del Rey; Frank A. Bescoby, Rancho Palos Verdes, both of Calif.

[73] Assignee: The Garrett Corporation, Los Angeles, Calif.

[21] Appl. No.: 684,242

[22] Filed: Dec. 20, 1984

[51] Int. Cl.⁴ .......................... F04B 17/00; F01D 5/08
[52] U.S. Cl. ..................................... 417/407; 415/175; 415/180; 416/244 A
[58] Field of Search ....................... 417/407, 408, 409; 415/115, 175, 180, 177; 384/103; 416/244 A

[56] References Cited

U.S. PATENT DOCUMENTS

| | | |
|---|---|---|
| 1,986,219 | 1/1935 | Richards ............................ 415/180 |
| 2,173,489 | 9/1939 | Voigt ................................. 417/407 |
| 2,578,785 | 12/1951 | Davis . |
| 2,680,001 | 6/1954 | Batt . |
| 2,858,101 | 10/1958 | Alford . |
| 2,938,659 | 5/1960 | Judson et al. . |
| 2,958,458 | 11/1960 | Wood . |
| 3,106,381 | 10/1963 | Leins . |
| 3,149,819 | 9/1964 | Baumann et al. . |
| 3,287,907 | 11/1966 | Bill . |
| 3,356,340 | 12/1967 | Bobo . |
| 3,740,163 | 6/1973 | Schinnerer et al. . |
| 3,845,619 | 11/1974 | O'Neill . |
| 4,116,499 | 9/1978 | Laurizio . |
| 4,127,988 | 12/1978 | Becker . |
| 4,133,585 | 1/1979 | Licht ................................. 384/103 |
| 4,156,342 | 5/1979 | Korta et al. . |
| 4,198,192 | 4/1980 | Webb . |
| 4,261,165 | 4/1981 | Burgermeister et al. . |
| 4,295,689 | 10/1981 | Licht ................................. 384/103 |
| 4,364,717 | 12/1982 | Schippers et al. . |
| 4,376,617 | 3/1983 | Okano et al. . |

Primary Examiner—Louis J. Casaregola
Assistant Examiner—Timothy S. Thorpe
Attorney, Agent, or Firm—Henry M. Bissell; James W. McFarland

[57] ABSTRACT

Apparatus for cooling and thermally isolating turbocompressor foil bearings. The bearing journal includes a hollow shaft through which gas is positively circulated to cool the shaft. A slinger at one end of the shaft develops a centrifugal pumping action during operation of the turbocompressor by virtue of a plurality of radially directed gas passages. Pressurized gas may be introduced from the compressor into the interior of the hollow shaft and, after traversing the shaft, returned to the compressor. The invention includes arrangements for protecting the bearing against combustion products which may leak past turbine wheel seals by removing such combustion products before they can reach the bearing.

32 Claims, 9 Drawing Figures

THERMAL ISOLATION SYSTEM FOR TURBOCHARGERS AND LIKE MACHINES

BACKGROUND OF THE INVENTION

1. Field of the Invention

This invention relates to gas lubricated bearings associated with the rotating shafts of gas turbines and turbocompressors and, more particularly, to arrangements for protecting such bearings from excessive heat from the associated machinery.

2. Description of the Prior Art

In gas turbine engines, or any other machinery in which high temperatures rotors are situated adjacent high speed bearings, it is essential to maintain the bearings at an acceptably low temperature. This is normally achieved, when the engine is running, by providing the bearings with an adequate supply of lubricating oil from a pump driven by the engine. However, this supply of cooling oil ceases when the engine stops, and the residual heat in the turbine rotor can be sufficient to damage the bearings adjacent the turbine rotor. Such bearings are especially vulnerable to the effect of heat-soak in the case of a gas turbine engine having a regenerative heat-exchanger and a thermally insulated main casing, because the residual heat in the turbine rotor on shutdown is virtually prevented from being dissipated to atmosphere.

Bearings located adjacent to turbine rotors are exposed to temperatures which are sometimes higher than is desirable because of conduction and the radiation of heat from the elevated temperature rotor. This may occur during steady state operation as well as after shutdown due to transfer of heat from the hot turbine wheels through the thermally conducting shaft to the bearings. In either case, the temperature rise occurring in the bearings may be more than can be tolerated by either the materials of which the bearing is constructed or the lubricant.

Gas lubricated bearings are being considered to overcome the problem of lubricant breakdown, especially that which is due to soak-back after shutdown of the machine. Although the use of such gas bearings reduces the magnitude of the problem considerably, certain limitations on the maximum temperature of the bearings must be observed. These limitations relate to the materials used in the bearings, primarily the coatings which are provided as anti-friction coatings for startup and shutdown when the rotational speed of the bearing journal is insufficient to maintain the gas film. In addition, the foils or elastic members of the gas bearings may be made from a material which provides the necessary compliance and elasticity at normal operating conditions while having to exhibit certain properties dictated by the specific application, such as compatibility with certain chemicals, corrosion resistance, etc. Because of such requirements, it may not be possible to use materials which are capable of withstanding the higher operating temperatures of conventional equipment.

Typical materials which are used as coatings on gas bearing foils are: Teflon, polyimide or other elastics, plastics, ceramics and, for the compliant bearing foils, beryllium copper, beryllium nickel, stainless steel, etc. It is important that the material limits and restrictions be maintained in order to provide the desired service life of the machinery. If the temperature exceeds acceptable limits, there may be a loss of wearability of the foil coatings or, in the extreme case, evaporation and destruction of the coating. Similarly, the foil material may creep if the temperature is too high, with attendant loss of elasticity and load bearing capacity.

In general, gas bearings usually require relatively large surface areas. From the standpoint of heat dissipation from the bearing, the larger surface area improves the capability to conduct heat through the shaft. Furthermore, the performance of gas bearings is enhanced if the shaft is constructed from a material with higher thermal conductivity, such as low alloy steels and certain copper alloys. Indeed, some prior art apparatus make special provision to improve the heat dissipation capability of bearings. Examples of such in the prior art may be found in O'Neill. U.S. Pat. No. 3,845,619 (compacted copper powder in hollow shaft for heat conduction); Laurizio U.S. Pat. No. 4,116,499 (heat conducting spikes in Teflon bearing pad); Burgermeister et al U.S. Pat. No. 4,261,165 (heat conducting element between bearing sleeve and housing); and Baumann et al U.S. Pat. No. 3,149,819 (conducting inserts in shaft). Such arrangements help to dissipate heat that may develop from imperfections of the bearing foil geometry in conjunction with less than optimum gas films during startup or instantaneous overload. However, while such heat conducting capability is desirable from the standpoint of assisting in dissipating heat from the bearing, it may also tend to increase the heat transfer to the bearing from equipment mounted on the shaft, such as a high temperature rotor, for example.

Recognizing the latter problem, various patentees have disclosed attempts to block heat transfer toward the bearings from an associated heat source. Examples of such prior art are found in Judson et al U.S. Pat. No. 2,938,659 (interruption of the engaging surfaces with grooves and slots, and provision of a baffle); Wood U.S. Pat. No. 2,958,458 (provision of an air space in the direct heat flow path); Leins U.S. Pat. No. 3,106,381 (use of thin metal parts for lower heat conductivity); Korta et al U.S. Pat. No. 4,156,342 (provision of spaces for cooling air paths in the bearing); Webb U.S. Pat. No. 4,198,192 (heat shield shrouds and use of spacers to define dead air spaces); and Schippers et al U.S. Pat. No. 4,364,717 (spacing of bearing housing from turbine housing with means for permitting cooling air flow through the inter-housing gap).

Other patentees, including Schippers et al, have disclosed the use of bleed air taken from the compressor to cool particular components in turbomachinery, such as turbine blades, turbine exhaust, bearings and/or interstitial spaces within the machinery. Examples of such prior art, some of which also incorporate various ones of the features mentioned hereinabove, include Okano et al U.S. Pat. No. 4,376,617; Becker U.S. Pat. No. 4,127,988; Schinnerer et al U.S. Pat. No. 3,740,163; Bobo U.S. Pat. No. 3,356,340; Bill U.S. Pat. No. 3,287,907; Alford U.S. Pat. No. 2,858,101; Batt U.S. Pat. No. 2,680,001; and Davis U.S. Pat. No. 2,578,785. In Bill, although the engine has hollow shafts, the ends of these shafts are closed and the cooling air is directed along the outside of the bearings and then pressurized by a centrifugal pump to introduce it into a region of the jet exhaust where elevated pressure is encountered.

As may be seen from a consideration of the plethora of different approaches to solving the bearing protection problem, no one solution has found universal acceptance. Efforts are still going forward to realize an improved and effective arrangement for protecting gas lubricated bearings, such as are used in association with turbomachinery, from the high operating temperatures of the turbine and from soak-back of residual heat when the turbine shuts down.

SUMMARY OF THE INVENTION

In brief, arrangements in accordance with the present invention provide improved means for both cooling pliant film bearings in turbomachinery or the like during operation and protecting such bearings by restricting heat transfer from a hot source, such as a turbine wheel, after shutdown of the machinery. Some of the disclosed arrangements also feature structures for protecting the bearings from contamination by combustion products from the turbine. In accordance with one particular aspect of the invention, these various embodiments provide for cooling a hollow bearing shaft by directing cooling air flow through the shaft inside the bearing.

One arrangement in accordance with the present invention utilizes a hollow shaft with a slinger assembly on one end of the shaft. The slinger assembly incorporates a plurality of radially directed slot recesses in a rotating planar disk which communicate with the interior of the hollow shaft through corresponding slotted openings in a cylindrical drum portion. As the slinger rotates with the hollow shaft, cooling air is drawn from the interior of the hollow shaft and directed radially outward where it is exhausted to ambient or otherwise removed from the bearing environment. A series of holes in the end of the shaft remote from the slinger permit the entry into the interior of the shaft of air drawn from the compressor associated with the turbine.

The slinger is mounted along the end of the hollow shaft adjacent the turbine wheel and extends partially inside the shaft between the inner surface of the shaft and a radially extended mounting surface or hub on a central tensioning member or tie bolt which attaches the turbine and compressor wheels and the shaft together. The slinger thus serves as a spacer between the shaft and the hot turbine wheel and serves to support the end of the shaft adjacent the turbine wheel. The slinger is constructed of low thermal conductivity material, such as titanium, thereby inhibiting the transfer of heat directly from the turbine wheel to the shaft both during operation and after shutdown.

Additionally the slinger cooling arrangement reduces the likelihood of contamination from "dirty" operating environments by directing contaminants away from the bearing in the cooling air stream. Examples of operating environments where this provides significant benefits for turbomachinery are where diesel engine exhaust products, such as soot, or the process residues, e.g. desiccants, from energy recovery applications are present.

In accordance with a further aspect of the invention, the slinger is mounted adjacent isolation disks serving as thermal barriers, restricting heat transfer from the hot turbine blades to the bearing housing and thereby serving to protect the bearing from excessive heat both during operation and after shutdown. Furthermore, the bearing housing is of large cross section, is made of a conducting metal, such as aluminum, and is supported from a massive mounting member, also made of a conducting metal such as aluminum, which forms the back wall of the compressor housing. Thus heat which reaches the bearing is readily conducted throughout the heat sink and thermal shunt formed by the bearing housing and the mounting member.

The turbocompressor assembly is held together by the central tensioning rod formed integrally with the turbine wheel and secured by a nut on the opposite end. The bearing housing is thermally isolated from the turbine scroll by a circumferential spider-like separator structure or spacer which is made of a low thermal conductivity steel, such as stainless steel. During operation the temperature of air flowing through the compressor is stabilized at a relatively low level, thereby removing from the heat sink members any heat which tends to raise the temperature of the compressor back wall above that level. Because of the substantial mass and good conductivity of the heat sink members and the thermal isolation of the bearing housing from the hot turbine scroll which is afforded by the low conductivity spider, the heat sink effectively limits to a safe level the temperature which the bearing can reach after shutdown. The end of the bearing journal adjacent the turbine is spaced therefrom with the slinger and one or more of the isolation disks situated in that space for added thermal insulation. Furthermore, the air driven radially outward by the slinger from the interior of the hollow shaft to atmosphere through the slots in the spider also carries with it any combustion gases which may leak past the turbine wheel seals, thereby preventing combustion products from reaching the bearing.

In one alternative arrangement in accordance with the present invention, the slinger is formed as an integral part of the hub portion of the bearing in the form of a plurality of radially directed holes drilled through the hub on the end adjacent the turbine. The interface between that end of the hub and the central turbocompressor shaft comprises a double re-entrant path which includes an inner wall portion of a circumferential passage through which the air is drawn to reach the slinger. This arrangement develops a barrier for heat transfer from the turbine to the hub portion of the bearing as a result of the extended path length through the solid structure extending between the hub portion and the central turbine shaft which combines with the cooling effect of the air moving within the hollow shaft adjacent a part of the extended structural support path to effect cooling when the machine is operating. This alternative arrangement in accordance with the invention also includes apparatus for drawing off contamination which may leak into the central bearing section of the machine from the turbine. A pressure gradient is developed between the outlet of the slinger and a connection to the low pressure side of the compressor which insures that any leakage is drawn off to the compressor and does not reach the bearing section.

Other embodiments provide protection of turbomachine bearings by combining arrangements to prevent contaminants from the turbine from reaching the bearing with a positive differential pressure coupling to the compressor which drives cooling air through the hollow bearing shaft to develop enhanced cooling during operation.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENTS

Figure 1:
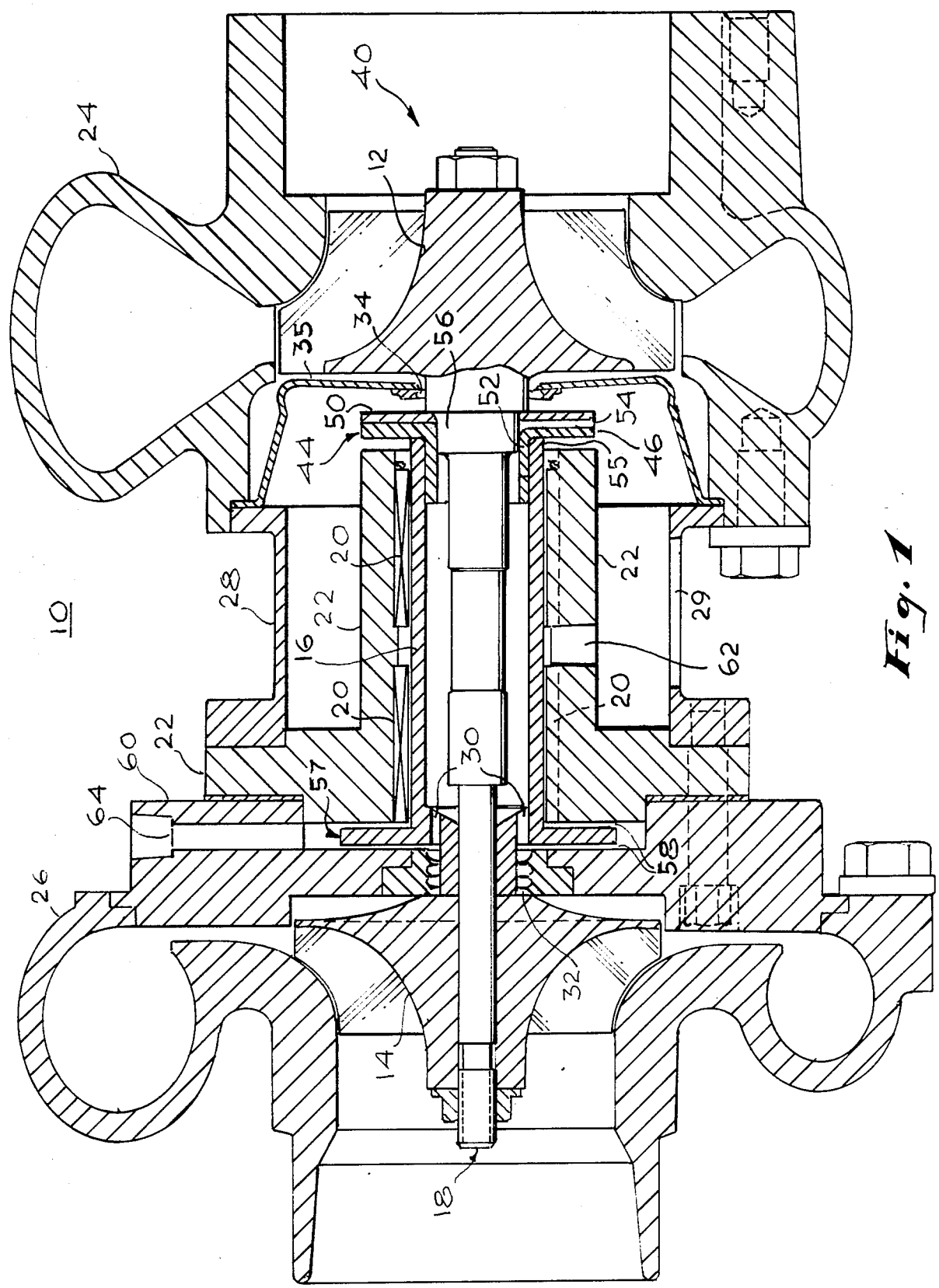
FIG. 1 is a cross-sectional view of a turbocompressor assembly incorporating one particular embodiment of the invention.

FIG. 1 is a sectional view of a turbocompressor assembly 10 incorporating one particular arrangement in accordance with the present invention. The turbocompressor 10 includes a sub-assembly 40 comprising a turbine wheel 12 and compressor wheel 14 mounted on a hollow shaft 16, the entire sub-assembly being tied together by a central tie bolt 18. The shaft 16 is a journal bearing shaft supported on pliant film bearings, represented schematically by the reference numeral 20, mounted within a bearing housing 22. The bearing housing 22 is supported from the compressor side of the assembly 40 and is spaced from the turbine side. The respective housings or scrolls 24 and 26 of the turbine wheel 12 and the compressor wheel 14 are separated by a thin-walled cylindrical separator 28, preferably of low conductivity metal such as stainless steel. The separator 28 is slotted about its circumferential surface with longitudinal openings 29 in a spider-like configuration to permit gas to flow outwardly from the bearing area and to further limit the transfer of heat from the turbine scroll 24 to the bearing housing 22. Labyrinth seals 32 on the compressor side and 34 on the turbine side contact adjacent rotating portions of the wheel assembly 40 to limit the escape of gases from the wheel housings into the central section of the turbocompressor 10. The seal 34 is supported on a thin steel separator disk 35 extending from the turbine housing 24 along the turbine wheel 12 to its juncture with the tie bolt 18.

Figure 2:
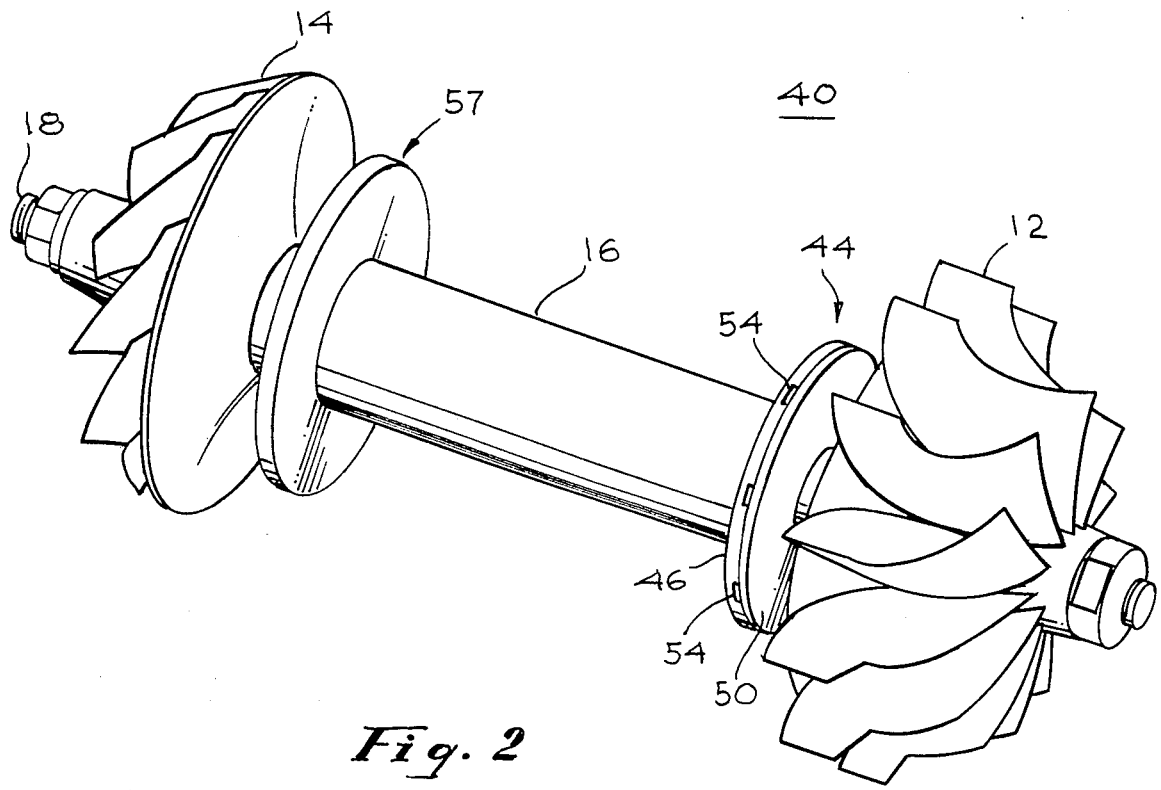
FIG. 2 is a perspective view of the wheel and shaft assembly from the turbomachine of FIG. 1.
Figures 3, 4:
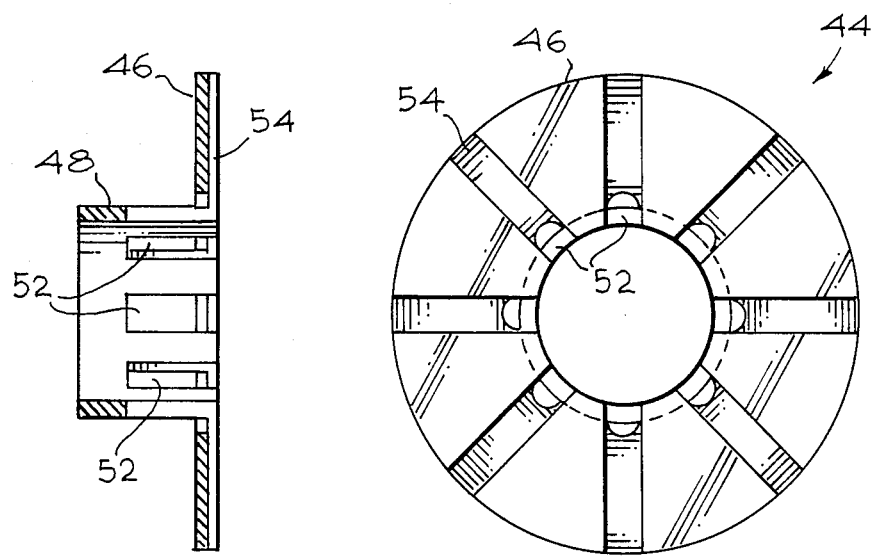
FIG. 3 is a side elevational view, in section, of one particular member of the assemblies of FIGS. 1 and 2.
FIG. 4 is an end view of the member of FIG. 3.

The two wheels 12, 14 and the shaft 16 making up the wheel assembly 40 are shown in FIG. 2. The shaft 16 has, mounted adjacent the right-hand end thereof, a slinger member 44 for drawing cooling air through the hollow shaft 16 during operation. It comprises a disk 46 and hub 48, formed as an integral unit and having a washer 50 mounted along the slot recessed face of the disk 46. Construction of the integral disk 46 and hub 48 is shown in detail in FIGS. 3 and 4. As shown in FIG. 3, the hub 48 is provided with a plurality, for example eight, of elongated slots 52 situated about the periphery of the hub 48. The disk portion 46 is provided with a corresponding number of radially directed slotted recesses 54 which communicate with the slotted openings 52 at the juncture of the disk portion 46 with the hub portion 48. FIG. 4 shows an end view of the slinger 44 with the slotted recesses 54 and the slot openings 52.

The washer 50 is omitted from FIGS. 3 and 4 for clarity but, as may be seen in FIGS. 1 and 2, serves to close the open sides of the recesses 54 to define a plurality of radially directed passages.

The hub 48 of the slinger 44 extends into the end 55 of the shaft 16, supporting it on the radially extended support portion or hub 56 of the tie bolt 18. Thus, the slinger 44 serves as a low conductivity radial spacer between the support portion 56 and the shaft 16 as well as an axial spacer and thermal barrier between the ends of the shaft 16 and associated bearing housing 22 and the turbine wheel 12. This isolates these members from the hot turbine wheel 12 and support portion 56 of the tie bolt 18. The slinger 44 may be fabricated of a low thermal conductivity material, such as titanium, and thus acts as a thermal barrier and shield for the shaft 16 against heat from the turbine wheel 12, both during operation and after shutdown. The separator disk 35 also inhibits heat transfer from the turbine section 24 toward the central bearing portion.

The end of the hollow shaft 16 remote from the slinger 44 extends radially outward to form a thrust bearing runner 57 between thrust bearing foils 58. The housing 22 of the journal bearing is mounted to a thick mounting member 60 which constitutes the back wall of the compressor housing 26. The thrust bearing runner 57 is situated in a space between the bearing journal 22 and the mounting member 60. Passages are provided for introducing cooling air from the compressor into the respective journal and thrust bearings to both cool and support the bearing foils. A passage 62 is provided approximately centrally of the bearing housing 22 and another passage 64 is provided in the mounting member 60 leading to the thrust bearing 57. Tubes and fittings (not shown) are connected to these passages to direct air thereto from the compressor. Air from the passage 64, after traversing the thrust bearing 57 in a radially inward direction enters the interior of the hollow shaft 16 through a plurality of holes 30. Similar holes may be provided through the shaft journal 16 in addition to, or instead of, the holes 30. This air then traverses the interior of the hollow shaft 16, drawn by the slinger 44 as previously described, and exhausts to atmosphere through slots 29 in the separator 28.

In operation, the slinger 44 acts as a centrifugal pump to force the circulation of cooling air outwardly along the radial recesses 54 in the slinger 44, drawing cooling air through the hollow shaft 16 from the entrant holes 30 at the opposite end. In this way, cooling air is forceably circulated through the interior of the hollow shaft 16 to draw off excess heat which may be generated in the bearing during operation of the machinery.

Figure 5:
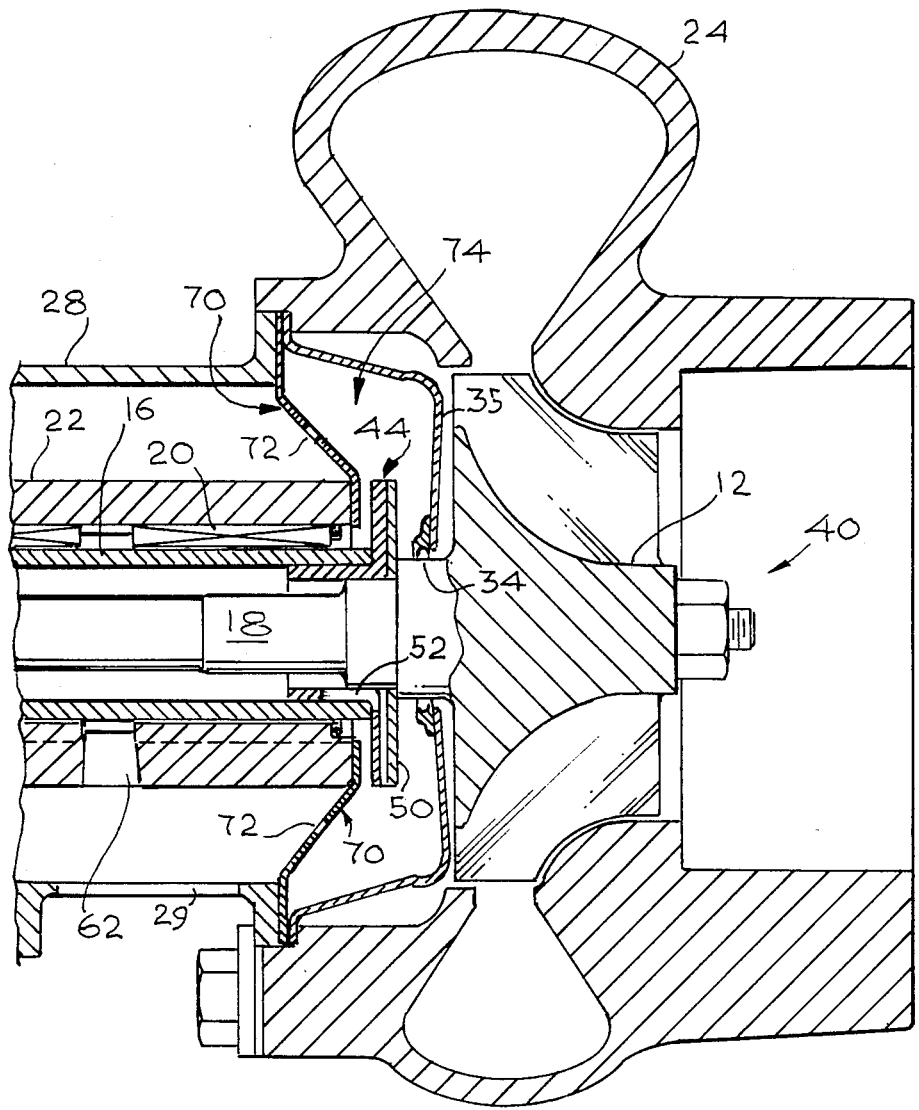
FIG. 5 is a sectional view of a portion of FIG. 1 showing a variant of the assembly of FIG. 1.

FIG. 5 is a reproduction of the right-hand side of FIG. 1 with a modification showing the addition of a separator disk 70 which is installed between the separator or spacer 28 and the turbine housing 24, adjacent the disk 35 which supports the seal 34 and serves as an inner end closure or back wall for the turbine housing. The disk 70 extends inwardly to bear against the right-hand end of the bearing housing 22, thereby defining with the disk 35 a chamber into which the cooling air from the slinger 44 is directed. A series of apertures 72 are mounted in a ring about the disk 70 to provide venting for this chamber, thereby permitting the cooling air from the slinger 44 to flow outwardly to the space within the separator 28 from which it exhausts to ambient and further assuring the removal of combustion gas which may leak past the seal 34 from the turbine. The disk 70 is of low thermal conductivity stainless steel or the like and is provided with a polished surface to reflect heat which reaches the chamber 74 back toward the turbine wheel 12. This is of particular significance in limiting soak-back of heat from the turbine area toward the bearing after the machine is shut down.

Figure 6:
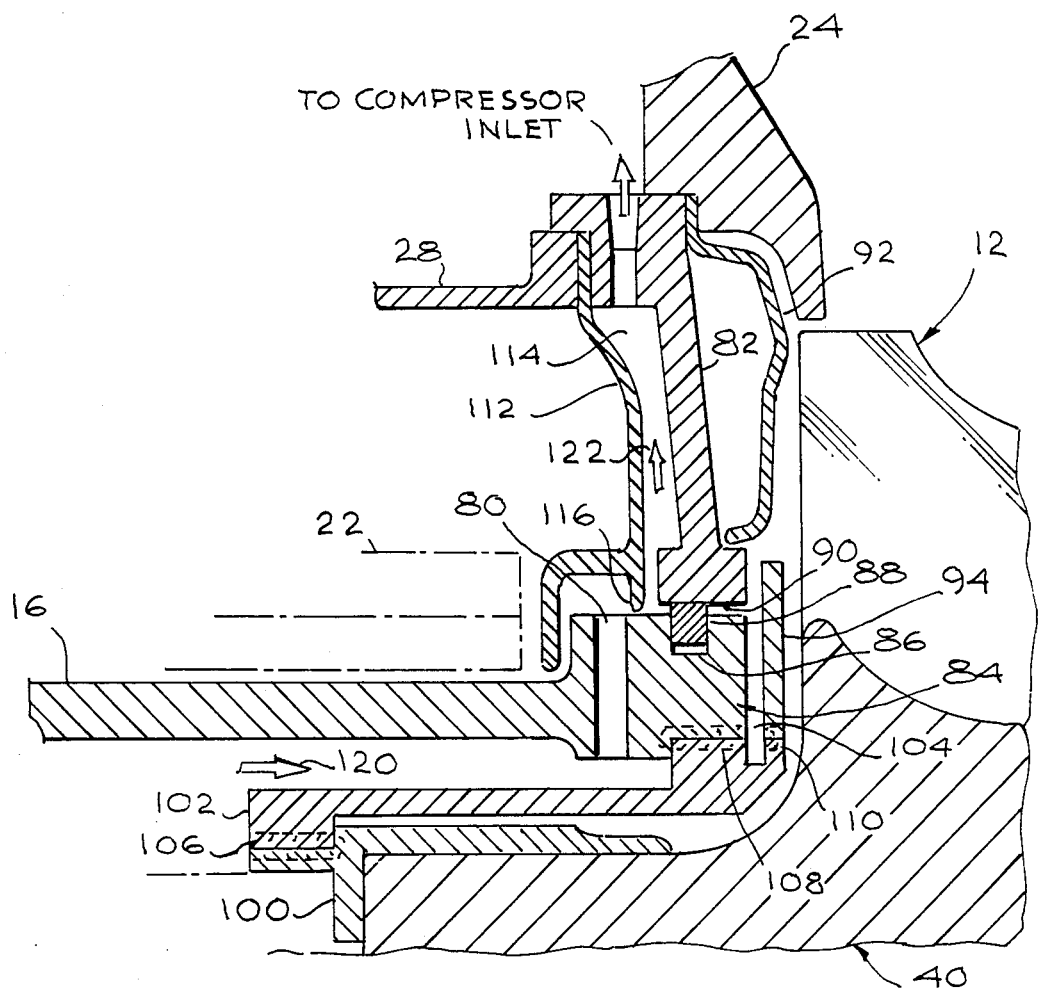
FIG. 6 is a schematic view of a portion of a further embodiment of the invention.

In the alternative embodiment illustrated in FIG. 6—a schematic sectional view of a portion of the journal bearing and turbine side of a turbocompressor 10—a turbine wheel 12, housing 24 and separator 28 are shown in relation to a hollow shaft 16 within an associated bearing assembly 22, represented in phantom outline. In this arrangement, the shaft 16 is provided with a plurality of radially directed passages 80 which are the functional equivalent of the slinger 44 of FIG. 1. A wall 82 extends inwardly from the housing 24 and provides a support for the end 84 of the shaft 16 adjacent the turbine wheel 12. The end 84 is slotted at 86 and includes a spring steel ring seal 88, similar to a piston ring, which bears against the inner surface 90 of the end wall 82. Between the wall 82 and the turbine wheel 12 is a thermal barrier disk 92 which limits heat transfer from the turbine toward the wall 82. A similar barrier disk 94 is positioned between the turbine wheel 12 and the end 84 of the shaft 16. Within the hollow shaft 16, in the space between the hub of the turbine wheel 12 and the inner surface of the shaft 16, are a pair of support members 100, 102. These serve to stabilize the hub of the turbine wheel and the adjacent end of the shaft 16 while providing an extended length path for heat to traverse through the metal support structure from the turbine wheel 12 to the shaft 16. The barrier disk 94 is affixed to the end of the support member 102 which is joined to the end 84 of the shaft 16 but is spaced from the end 84 by a distance defined by the slot 104. The support member 100 is mounted on the hub of the turbine wheel 12 by a press fit and is joined to the adjacent support member 102 by electron beam welding at 106. Similar welds are provided at 108 and 110 to join the end 84 of the shaft 16 and the barrier disk 94, respectively, to the support member 102.

A further thermal barrier disk 112 is mounted on the bearing side of the wall 82 which serves to define an air chamber or passage 114 between the disk 112 and the wall 82. This passage is connected to the air compressor inlet through a suitable tubing connection (not shown) and thus is maintained at a lower pressure than any point within the area of the bearing 22 or inside the hollow shaft 16. Air which is injected into the interior of the hollow shaft 16 by any of the various schemes described herein is taken from the compressor in the vicinity of the compressor outlet. This cooling air, indicated by the arrow 120, is directed outwardly by centrifugal pumping action through the passages 80 where it is free to flow into the region of the bearing 22. This air is substantially prevented from reaching the space 114 by the seal 116. Any air which reaches the passage 114, either past the seal 116 or from the turbine area past the seal 88, will be drawn to the compressor inlet as indicated by the arrows 122, thereby drawing off whatever contaminants may reach that passage from the turbine area and preventing them from possibly contaminating the bearing 22.

Figure 7:
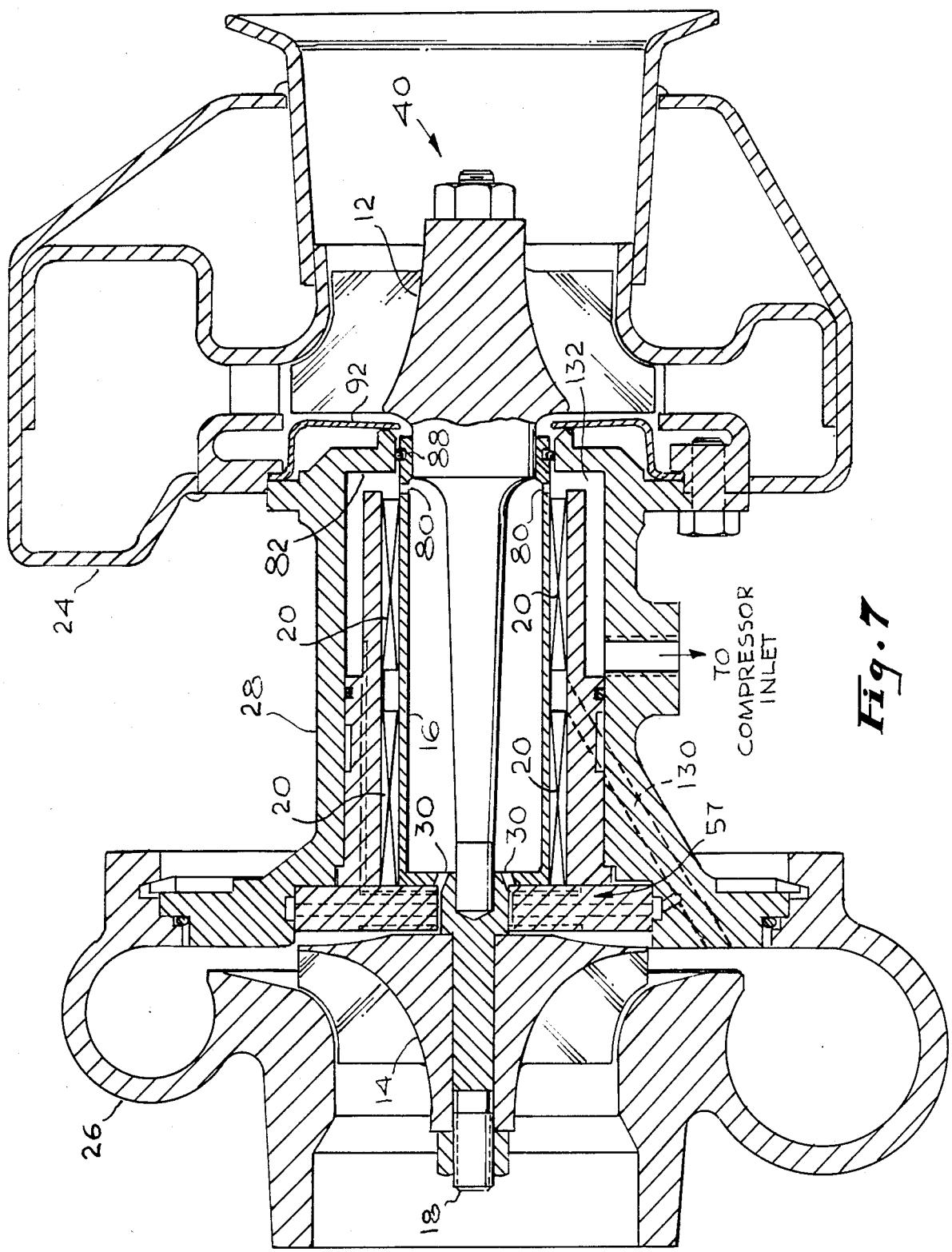
FIG. 7 is a cross-sectional view of another turbocompressor assembly illustrating an alternative embodiment of the invention.

The arrangement of FIG. 7 is shown comprising a turbomachine much like that of FIG. 1, having a turbine wheel 12 mounted on a central rod 18 within a bearing shaft 16. Compressed air is taken from near the outlet of the compressor 26 through a passage 130 and is directed to the region of the bearing foils 20 for cooling and pressurizing the bearing. Some of this air flows through one set of the bearing foils 20, toward the turbine wheel 12, to a return passage 132 which is connected to the compressor inlet by tubing (not shown). Air from the passage 130 also flows through the other set of bearing foils 20 where it also pressurizes and cools the thrust bearing 57 and then passes through openings 30 to the interior of the hollow shaft 16. This air then flows along the interior of the hollow shaft 16 and exits through radially directed holes 80 which are drilled at the end of the shaft 16 remote from the entrance passages 30. Air flowing through the holes 80 reaches the chamber 132 and is then directed to the compressor inlet. A seal 88 and end wall 82 are provided to block contaminants from the turbine section against reaching the area of the bearing foils 20, while the heat barrier disk 92 is provided as in FIG. 6 to prevent heat from reaching the end wall 82. Because of the reduced pressure in the chamber 132, any contaminants which leak past the seal 88 will be drawn out to the compressor inlet, rather than reaching the bearing foils 20.

Figure 8:
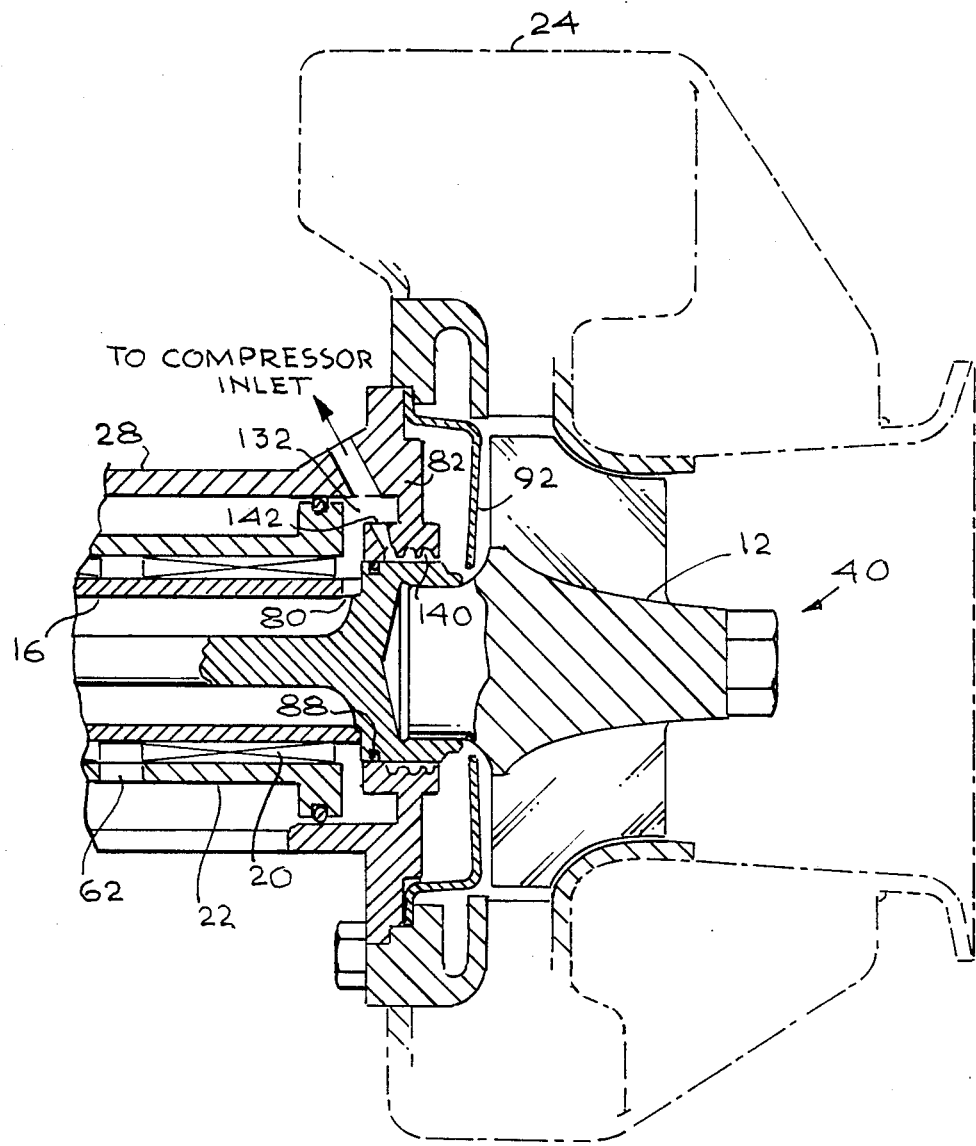
FIG. 8 is a sectional view of the turbine portion of the assembly of FIG. 7, illustrating another particular arrangement in accordance with the invention.

FIG. 8 shows a comparable arrangement to that of FIG. 7, and like reference numerals are used to designate like elements. In addition to the ring seal 88, the wall 82 is provided with a labyrinth seal portion 140; and an air passage 142 is provided for communication with the chamber 132 which is connected to the compressor inlet. Pressurized air from the compressor is introduced through the opening 62 to pressurize the bearing foils 20 in the manner previously described. Air from the interior of the hollow shaft 16 is directed outwardly through the holes 80 in the shaft 16 to the chamber 132, from which it is returned to the compressor inlet along with any contaminants reaching the chamber 132 from the turbine.

Figure 9:
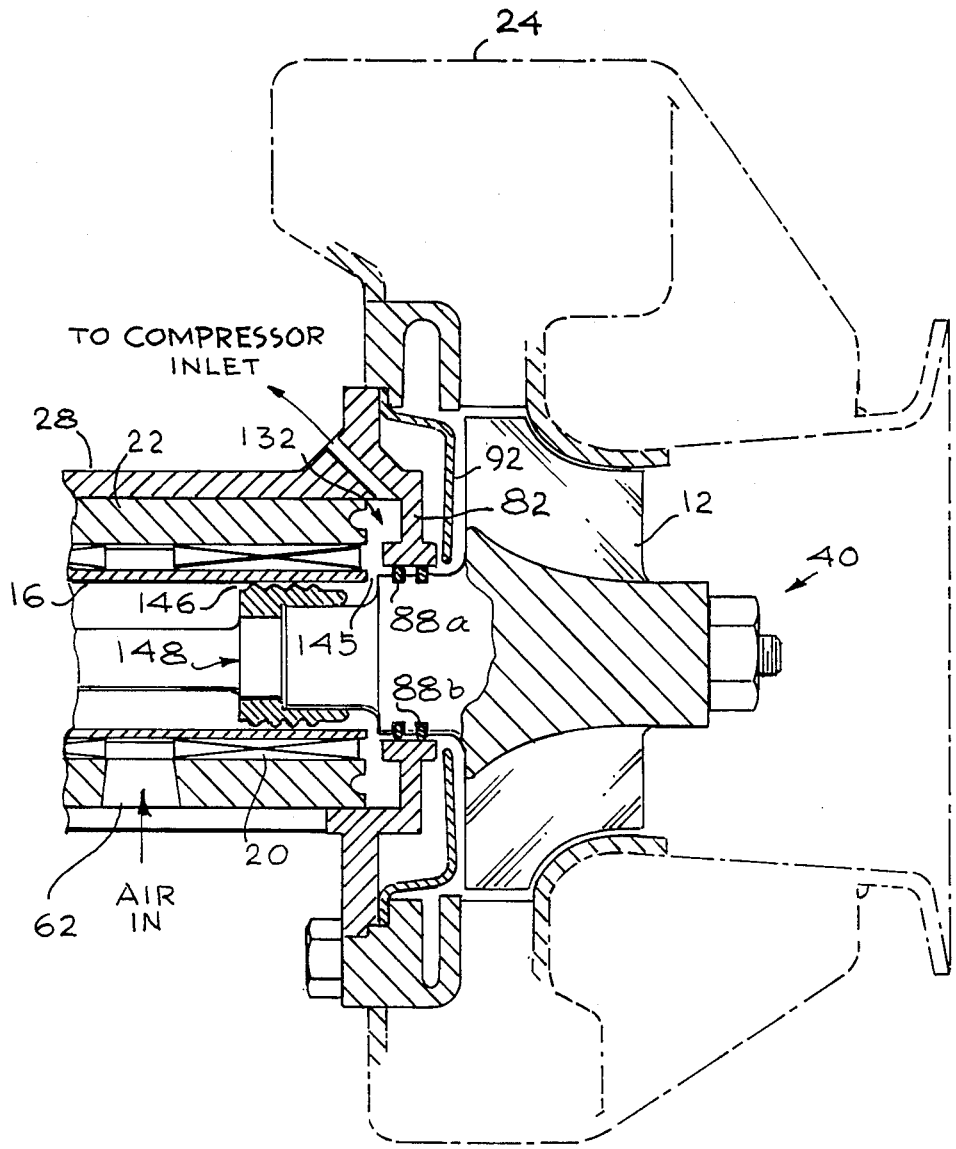
FIG. 9 is a sectional view, like FIG. 8, illustrating still another arrangement in accordance with the invention.

FIG. 9 depicts still another arrangement in accordance with the invention for providing positive air flow cooling through the interior of the hollow bearing shaft 16 while also serving to remove contaminants from the area of the turbine wheel 12 so that these contaminants do not reach the bearing foils. In this arrangement, a pair of ring seals 88a, 88b are positioned side by side at the inner surface of the end wall 82. The end of the hollow shaft 16 is axially separated from the turbine wheel 12 by a space which is part of the air passages from the interior of the hollow shaft 16, the remainder of the passages being provided by slots 146 which are axially formed in the mounting hub 148 which serves as a stabilizing support member between the turbine wheel 12 and the bearing shaft 16. These air passages communicate with the chamber 132 which is connected to the compressor inlet through suitable tubing (not shown). The radially directed passages 145 provide some centrifugal pumping action which, added to the pressure of air from the compressor at the inlet 62 of the bearing, serves to direct cooling air through the interior of the hollow shaft 16.

There have thus been shown and described various arrangements in accordance with the present invention for providing positive cooling and thermal isolation of foil bearings used in turbomachinery. In these arrangements, the journal bearing of the machine includes a hollow shaft and air is positively directed through the interior of the shaft to assist in cooling the bearing during operation of the machine. Thermal barriers and extended length paths for supporting the shaft from the turbine wheel are incorporated to limit thermal soak-back to the bearing when the machine is shut down. A thermal shunt and heat sink structure is also provided to draw heat from the bearing housing toward the compressor, during operation, and to absorb heat after shutdown which soaks back from the turbine toward the bearing, thereby limiting the maximum temperature reached by the bearing to a level well within the tolerance of the bearing foils.

The resulting structural combination is an extremely effective configuration for protecting bearing foils against excessive temperatures, both during operation and after shutdown. In one specific embodiment, corresponding to that shown in FIG. 1, wherein the dimension from the back surface of the turbine wheel 12 to the adjacent surface of the washer 50 was 0.25 inches, temperatures measured at a point adjacent the right-hand end of the bearing housing 22 did not exceed 300° F. with a turbine gas inlet temperature of 1720° F. This indicates a temperature gradient between the end of the shaft 16 and the turbine wheel 12 of approximately 1000° to 1100° F. in little more than 0.30 inches of length. Arrangements are also incorporated for limiting leakage of contaminants from the turbine side of the machine into the bearing area and for positively removing these contaminants so that they cannot reach the bearing foils.

Although there have been described above various specific arrangements of a thermal isolation system for turbochargers and like machines in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. Apparatus for protecting turbomachinery bearings comprising:
   a pliant foil bearing having a plurality of foils extending about a rotatable shaft;
   a hollow shaft mounted to rotate within the pliant foil bearing and being coupled to a turbine wheel, said turbine wheel having a hub, at least a portion of the hollow shaft comprising a bearing journal;
   means for coupling the shaft and wheel together in driving relationship, said coupling means comprising an end closure at the end of the shaft remote from the wheel for mounting the shaft on an axial tensioning rod extending from the turbine wheel, the hollow shaft extending generally along said rod and spaced therefrom to define an annular space between the shaft and the rod, and thermal isolating support means mounted between the hollow shaft and the turbine wheel for supporting the wheel from the shaft at the end adjacent the wheel while limiting heat transfer through said support means, said thermal isolating support means comprising a generally cylindrical intermediate shaft mounted between said hollow shaft and the turbine wheel hub in supporting relationship, the intermediate shaft being affixed to the hub at one end of the intermediate shaft, the other end of the intermediate shaft being affixed to the end of the hollow shaft; and
   means for circulating a gas through said annular space within the hollow shaft to cool the shaft.

2. The apparatus of claim 1 wherein the circulating means includes means for positively driving the cooling gas through the hollow shaft.

3. The apparatus of claim 2 wherein the driving means define a plurality of radially directed slots adjacent the end of the hollow shaft which is nearer the turbine wheel, said slots communicating with the interior of the hollow shaft.

4. The apparatus of claim 3 wherein the slot defining means comprise a slinger mounted at said nearer end of the hollow shaft and having a cylindrical portion extending into the hollow shaft, the cylindrical portion being mounted on an axial hub extending from the turbine wheel to support said hollow shaft end thereon.

5. The apparatus of claim 4 wherein the slinger comprises first and second members juxtaposed together to define a plurality of gas passages.

6. The apparatus of claim 5 wherein the first member comprises a cylindrical hub portion integrally formed with a planar disk portion, the disk portion having a plurality of evenly spaced, radially directed, linear recesses on one face thereof defining said slots.

7. The apparatus of claim 6 wherein the second member comprises a planar disk washer bearing against said one face of the first member to close the slots along the radial extent thereof.

8. The apparatus of claim 6 wherein the hub portion of the first member is mounted at least partially within one end of the hollow shaft and incorporates a plurality of evenly spaced, slotted openings extending through the wall of the hub portion and communicating with corresponding ones of the slots.

9. The apparatus of claim 8 wherein the slotted openings of the hub portion are positioned to communicate with the interior of the hollow shaft.

10. The apparatus of claim 7 further including a cylindrical bearing housing extending around the hollow shaft to hold the compliant foil bearing on the shaft and wherein the planar disk member and disk washer have an outer diameter at least as great as the outer diameter of the cylindrical bearing housing to shield the bearing and housing against heat radiating from the turbine.

11. The apparatus of claim 10 wherein the slinger is fabricated of material having low thermal conductivity to limit the transfer of heat by conduction from the turbine wheel to the bearing.

12. The apparatus of claim 11 wherein said material is titanium.

13. The apparatus of claim 2 wherein the driving means comprises a compressor mounted on the opposite end of the hollow shaft from the turbine wheel and coupled to be driven by the turbine, and further including means for admitting pressurized gas from the compressor to the interior of the hollow shaft at the end remote from the turbine wheel.

14. The apparatus of claim 13 further including means for releasing gas outwardly to ambient after traversing the interior of the hollow shaft.

15. The apparatus of claim 13 further including means for defining a chamber for receiving gas after it traverses the interior of the hollow shaft.

16. The apparatus of claim 15 further including means communicating with said chamber for drawing said gas from said chamber and directing it to an inlet region of the compressor.

17. The apparatus of claim 16 further including generally radially directed wall means extending along one side of the chamber between the chamber and the turbine wheel and sealing means mounted about an inner central opening for sealing the inner surface thereof to prevent contaminants from the turbine area from reaching the bearing.

18. The apparatus of claim 17 wherein said chamber is effective to collect contaminants leaking past the sealing means and to direct such contaminants to the inlet region of the compressor.

19. The apparatus of claim 17 wherein the means defining said chamber further includes a thin disk-shaped annular wall member remote from the wall means and having a seal about the periphery of a central opening for separating the chamber from the region where the gas leaves the interior of the hollow shaft, the operating pressure in said region being greater than the operating pressure in said chamber in order to direct contaminants away from said region and thereby prevent their reaching the bearing.

20. The apparatus of claim 13 wherein pliant foil bearing comprises a combination journal bearing and thrust bearing, the thrust bearing being situated at the end of the hollow shaft adjacent the compressor, and further including means for directing pressurized gas from the compressor to the vicinity of the journal bearing foils to flow along the foils to the vicinity of the thrust bearing foils to cool said foils.

21. The apparatus of claim 20 further including means defining a plurality of passages communicating between the thrust bearing foils and the interior of the hollow shaft for directing pressurized gas from the thrust bearing into the interior of the hollow shaft.

22. The apparatus of claim 21 further including means defining a chamber positioned to receive gas flowing between the journal bearing foils in a direction away from the thrust bearing and means for directing gas from said chamber to the low pressure side of the compressor.

23. The apparatus of claim 22 further including means defining a plurality of radially directed openings in the hollow shaft adjacent said chamber, said openings communicating with said chamber for returning gas traversing the interior of the hollow shaft to the low pressure side of the compressor.

24. The apparatus in accordance with claim 10 wherein said cylindrical bearing housing is constructed of a material possessing high thermal conductivity and in a configuration presenting a substantial cross sectional area and volume and further including a back wall of the compressor fabricated of a material possessing high thermal conductivity in a configuration presenting a substantial cross sectional area and volume, the cylindrical bearing housing being mounted against said back wall in order to conduct heat readily from the bearing to the compressor.

25. The apparatus of claim 18 further including a thin-walled disk member mounted adjacent the back of the turbine wheel for reflecting heat away from the bearing.

26. The apparatus of claim 25 wherein said disk member is mounted between the turbine wheel and the wall means of said chamber.

27. The apparatus of claim 1 wherein the intermediate shaft is thin-walled and of extended length to restrict the transfer of heat from the turbine hub to the hollow shaft.

28. The apparatus of claim 27 wherein the intermediate shaft is constructed of low thermal conductivity material.

29. The apparatus of claim 1 further including a thin radiation barrier disk affixed to the end of the intermediate shaft adjacent the turbine wheel and spaced from the end of the hollow shaft in the direction of the turbine wheel for reflecting radiant heat away from the hollow shaft.

30. The apparatus of claim 1 wherein the intermediate shaft comprises a pair of generally cylindrical members mounted one within the other and spaced from each other except at the ends of said members which are remote from the turbine wheel, the other end of the innermost member being mounted on the wheel hub and the other end of the outermost member being mounted to the end of the hollow shaft which is adjacent the wheel.

31. The apparatus of claim 30 further including a rotatable ring seal mounted in a recess on the end of the hollow shaft which is adjacent the wheel, a first disk member mounted adjacent the back wall of the turbine and having an annular surface in sealing contact with said ring seal, and means for withdrawing any contaminants from the turbine which pass the ring seal before said contaminants can reach the bearing foils.

32. The apparatus of claim 31 further including a second disk member between the first disk member and the bearing foils, said second disk member including a sealing surface adjacent a peripheral surface of the hollow shaft, said first and second disk members defining a chamber for trapping contaminants leaking past the ring seal from the turbine.

* * * * *